United States Patent [19]
Shanks et al.

[11] 4,328,493
[45] May 4, 1982

[54] LIQUID CRYSTAL COLOR DISPLAYS

[75] Inventors: Ian A. Shanks; Michael G. Clark, both of Malvern, England; Frank M. Leslie, Glasgow, Scotland

[73] Assignee: National Research Development Corporation, London, England

[21] Appl. No.: 114,464

[22] Filed: Jan. 23, 1980

[30] Foreign Application Priority Data

Jan. 24, 1979 [GB] United Kingdom ............... 2482/79

[51] Int. Cl.³ ............................................. G09G 3/36
[52] U.S. Cl. ..................................... 340/784; 340/703; 340/713; 340/716; 350/346; 350/352
[58] Field of Search ................ 350/346, 352; 340/701, 340/703, 716, 784, 713

[56] References Cited

U.S. PATENT DOCUMENTS

| | | | |
|---|---|---|---|
| 3,118,079 | 1/1964 | Lehmann | 340/704 |
| 3,410,999 | 11/1968 | Fergason et al. | 340/704 |
| 3,579,252 | 5/1971 | Goodman | 340/701 |
| 3,669,525 | 6/1972 | Adams et al. | 350/352 |
| 3,836,230 | 9/1974 | Adams et al. | 350/352 |
| 3,857,629 | 12/1974 | Freiser | 350/346 |
| 3,991,416 | 11/1976 | Byles et al. | 340/784 |
| 4,009,934 | 3/1977 | Goodwin et al. | 350/346 |
| 4,031,529 | 6/1977 | Borel et al. | 350/346 |
| 4,036,553 | 7/1977 | Borel et al. | 340/704 |

*Primary Examiner*—Marshall M. Curtis
*Attorney, Agent, or Firm*—Pollock, VandeSande & Priddy

[57] ABSTRACT

A liquid crystal color display comprises a cathode ray tube which emits at two or more wavelengths, a liquid crystal cell, a neutral analyzer and two color selective polarizers. The cell is switched in synchronism with different images supplied to the cathode ray tube so that the different images are observed in the different colors simultaneously. The cell is respectively switched ON and OFF by application of signals at a low frequency $f_l$ and a high frequency $f_h$. To avoid a patch appearance due to different parts of the liquid crystal having different twists a gap is allowed between switching the signals $f_l$ and $f_h$ so that the total shear of the liquid crystal may be kept below a critical shear value.

10 Claims, 15 Drawing Figures

*Fig.5.b.*

LIQUID CRYSTAL COLOR DISPLAYS

This invention relates to liquid crystal displays generally and particularly to a field sequential display using a liquid crystal to control observed colors or polarization.

Liquid crystal displays commonly comprise a liquid crystal cell and associated electrical supplies. A cell comprises a thin layer of liquid crystal material enclosed between two glass slides. Transparent electrodes (e.g. Stannic Oxide films) on the inner faces of the slides enable a voltage to be applied across the layer to cause an electric field induced change in the molecular ordering. There are three classes of thermotropic liquid crystal material known as smectic, nematic and cholesteric each with a different ordering of their molecular structure. This invention is concerned with displays using a nematic material or a mixture of a nematic material plus a small amount of cholesteric material giving a long pitch cholesteric material.

One known type of cell is termed a twisted nematic cell and is optically active, i.e. it can rotate the plane of plane polarized light by typically 90° in the OFF state (zero applied voltage). On application of a suitable voltage the cell loses its optical activity and is in an ON state. Thus by placing the cell between crossed, or parallel polarizers an opto electric shutter may be provided. The twisted nematic cell is described by Schadt and Helfrich, February, 1971, Applied Physics Letters, Vol. 18, No. 7, pages 114/5.

If a layer of birefringent material is placed between a polarizer and the cell with the optic axis of the birefringent layer at 45° to the adjacent polarizing axis then a two colour filter may be obtained by switching the cell ON and OFF. Such a filter is described in U.K. Pat. Nos. 1,469,638 and 1,466,715. The latter patent also described how the birefringent layer and adjacent polarizer may be replaced by a color selective polarizer.

The color switch noted above has been used in combination with a monochrome cathode ray tube display to show a color television display. This is disclosed in U.K. Pat. No. 1,491,471 in which two sets of layers of birefringent material and liquid crystal cells are used to switch sequentially three colors observed from a television screen in synchronism with three successive fields of the screen. Successive fields of a television picture are shown in appropriate single colors imparted to the monochrome emission from the CRT by the liquid crystal color filter. Providing the cells are switched fast enough the retinal persistence of an observer ensures the individual fields are fused together to produce a multi-colored display.

Field sequential television displays require short turn-ON and turn-OFF times. This may be achieved by a two frequency switching method as described in U.K. Pat. No. 1,410,161. Some liquid crystal materials are characterized by a positive dielectric anisotropy when subject to alternating electric signals below a critical frequency of $f_c$. Above this frequency the material has a negative anisotropy. As a result the application of a signal of frequency less than $f_c$ causes the liquid crystal molecules to align parallel with the applied field i.e. the cell ON state. If the low frequency signal $f_l$ is removed and a high frequency $f_h$ is applied, $f_h > f_c$, then the liquid crystal molecules are driven by the associated field to lie perpendicular to the field and hence parallel to the slides and adopt the cell OFF state.

Sequential application of $f_l$ and $f_h$ causes the cell to switch ON and OFF at the frequency of applying $f_l$ and $f_h$ typically 25 Hz.

One problem of the above two frequency switching is the patchy appearance of the display.

In liquid crystal cells not switched by the above two frequency method a patchy appearance has been observed and found to be caused by areas of reverse twist and reverse tilt. This is described in U.K. Pat. Nos. 1,472,247 and 1,478,592. Briefly, areas of reverse twist in a twisted nematic cell can be avoided by including a small amount of cholesteric to give a natural pitch greater than twice the cell layer thickness. This imparts a preferred twist to the molecules so that the twist in the cell is always in a single direction. Reverse tilt can be avoided by surface treatment of the glass slides so that the molecules in the center of the layer have an appropriate initial tilt in the same direction.

Despite using the above information it has been found that large area field sequential color displays still showed a patchy appearance. The problem became more noticeable as the display size increases beyond 5×5 cm.

According to this invention a liquid crystal display comprises a cathode ray tube having a screen which is capable, when energized, of emitting light in at least a first and a second narrow range of wavelengths, field scan circuitry for providing at least a first and a second field image on the screen in sequence and related to different input means, at least a first and second color selective polarizer each having a selective transmission at different ones of the peak wavelengths emitted by the screen and arranged with their optical axis at an angle to one another, a liquid crystal cell capable of rotating the plane of plane polarized light passing there through and transmitting polarized light without such rotation dependent on electrical signals applied to the cell, the cell itself comprising two parallel spaced transparent slides bearing transparent electrode structures on their opposing inner faces and a layer of nematic or cholesteric liquid crystal material between the slides, the layer material having a cholesteric pitch greater than twice the layer thickness and a dielectric anisotropy which changes between positive and negative values around a critical frequency, $f_c$, of applied electrical signals, a source of electrical signals of frequency, $f_l$, less than $f_c$, a source of electrical signals of frequency, $f_h$, greater than $f_c$, means for alternately applying the signals $f_l$ and $f_h$ to the cell in synchronism with different fields of images displayed on the screen, delay means for providing a delay between removal of $f_l$ from the cell and application of $f_h$ to the cell so that liquid crystal molecules may rotate from a position normal to the liquid crystal layer, timing means for controlling the application of signals $f_l$, and timing means for limiting application of signals $f_h$ whereby reverse tilt within the layer is avoided, the arrangement being such that a required display is shown as successive fields of different images and observed as an image in two or more colors.

The input means may be two or more separate inputs from different equipment such as different waveform trace equipments, or a radar display of aircraft movements and a separate computer information display. Alternatively the input means may be a single input but supplied with time shared signals representing different equipment or different color images from a video camera.

The liquid crystal material may be a mixture of one or more nematic materials such as the proprietary mixtures, ZLI 518 or ZLI 1085 from E. Merck, Darmstadt, Germany, alone or together with a cholesteric liquid crystal material such as cholesteryl nonanoate or a non-liquid crystal chiral material that, when added to a nematic liquid material, produces a cholesteric liquid crystal material.

The delay means may be arranged to apply the signals $f_h$ when the liquid crystal molecules are in their "kick back" condition hereinafter described. The delay is typically 4 ms but may be 0.5 ms to 10 ms, depending on the liquid crystal material used and thickness of the liquid crystal layer. The time of application of signals $f_h$ may be 1 ms to 10 ms depending on the liquid crystal material used and the rms value of the high frequency drive signal.

The invention will now be described by way of example only with reference to the accompanying drawings of which:

Figure 2:
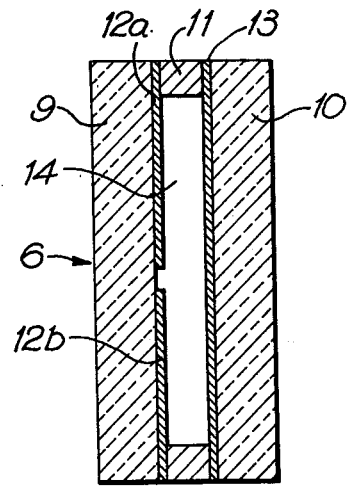
FIG. 2 is a sectional view of a liquid crystal cell for use in FIG. 1.
Figure 7:
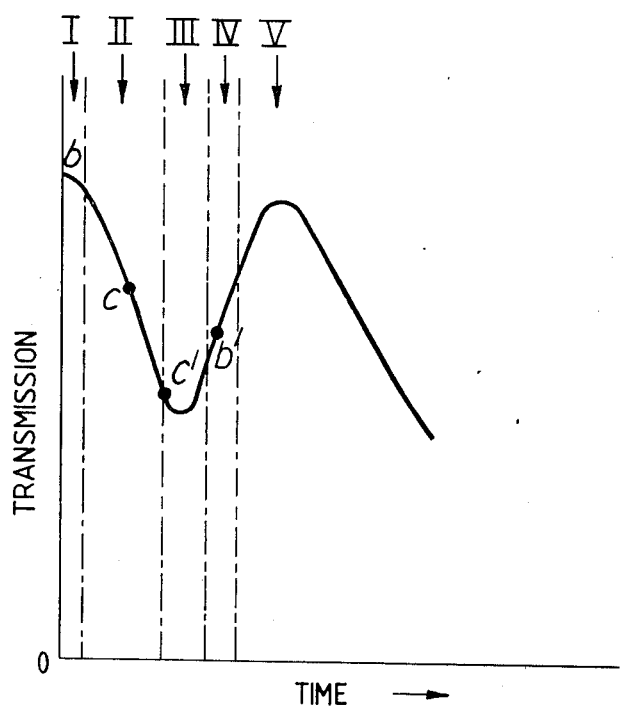
Figure 5A:
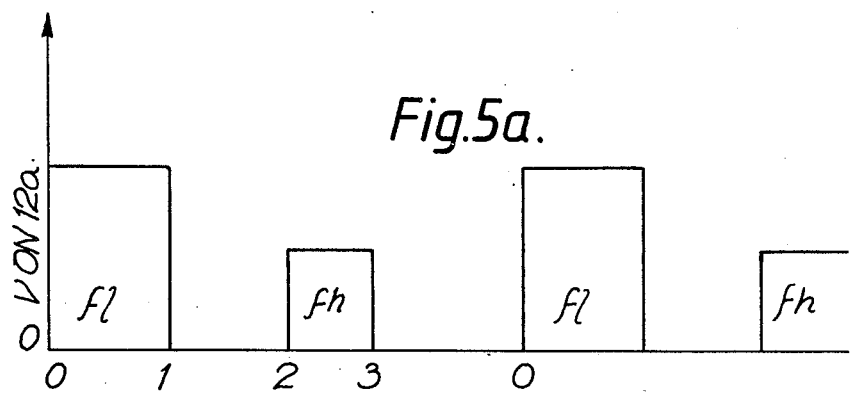
Figure 6:
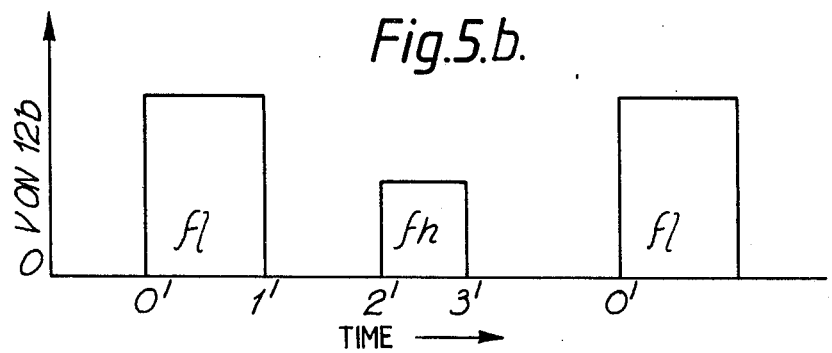
Figure 6:
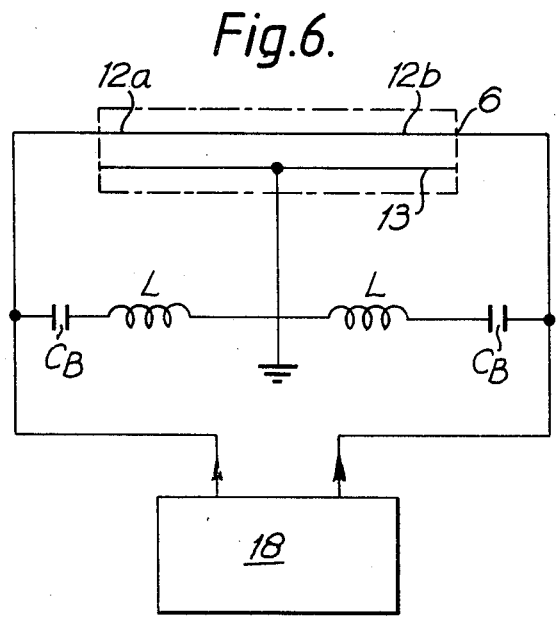

FIGS. 4a–h are diagrammatic representations of molecular alignments in a liquid crystal cell at various times;

FIGS. 5a and 5b are waveform diagrams showing the peak values of signals applied to the cell of FIG. 2;

FIG. 6 is a block diagram showing use of a tuned circuit incorporating the cell of FIG. 2; and FIG. 7 is a graph of transmission against time for a liquid crystal cell.

Figure 1:
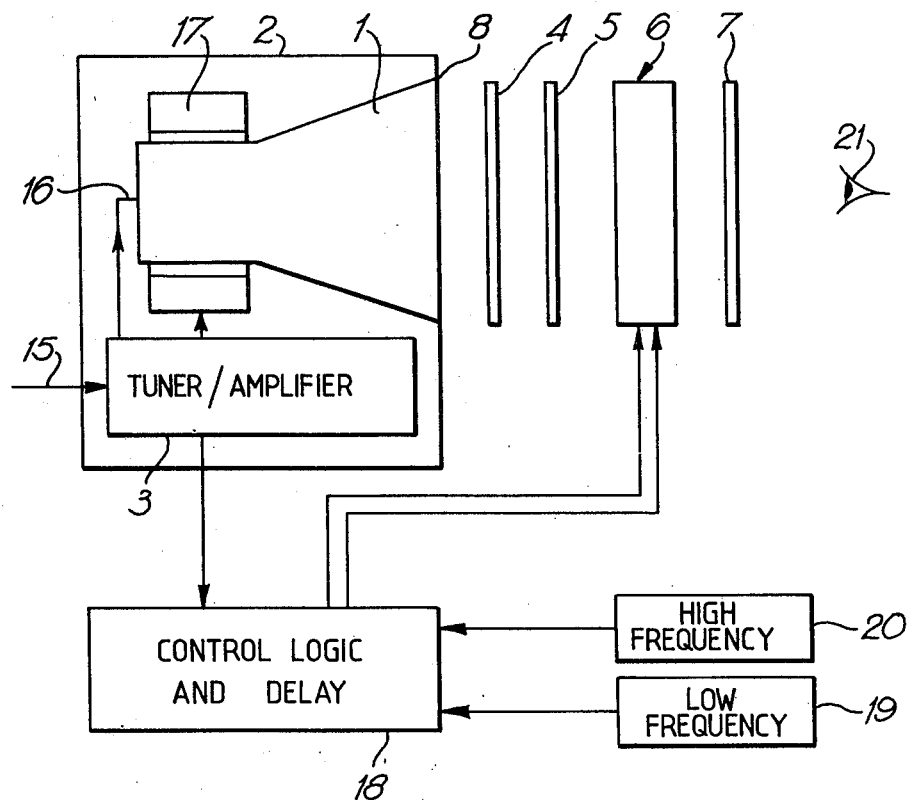
FIG. 1 is a side view of a two color television display.

As shown in FIG. 1 a color television comprises a cathode ray tube 1 mounted inside a cabinet 2 containing conventional driving circuits 3. In front of the CRT 1 in serial order are a first color selective polarizer 4, a second color selective polarizer 5, a twisted nematic liquid crystal cell 6, and a neutral linear polarizer 7. The positions of the linear polarizer 7 and the two color selective polarizers may be interchanged if wished.

A television aerial input 15 feeds a frame sequencer which selects red and green pictures alternately from a conventional TV tuner and amplifier circuits 3 and provides signals to a grid or cathode to modulate an electron beam from an electron gun 16 at the rear of the cathode ray tube 1 and signals to raster scanning coils 17. Additionally a 50 Hz field synchronization signal is provided to the liquid crystal cell control circuit 18. This control circuit 18 is adjustable to switch signals $f_l$ and $f_h$ from two frequency supplies 19, 20 and to the cell with the correct delays and burst lengths.

Figure 3:
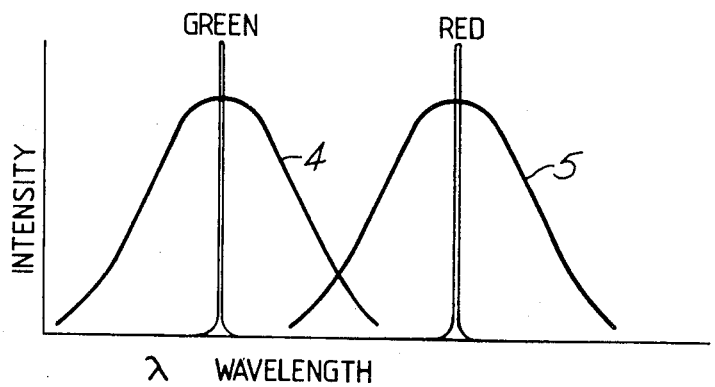
FIG. 3 is a graph of emission against wavelength for a cathode ray tube used in FIG. 1.

The cathode ray tube has a screen 8 coated with a phosphor mixture which emits visible light over two narrow wavebands as shown in FIG. 3. These wavebands may be at 560 nm and 630 nm i.e. a green and red color.

The first color selective polarizer 4, FIG. 1, transmits white polarized light along its vertically disposed polarizer transmission axis and absorbs red light (and passes green light) at an axis perpendicular to this polarizing axis i.e. it is a green filter. The second color selective polarizer 5 is similar but its polarizer transmission axis is arranged horizontally and it absorbs green light (while transmitting red light) at an axis perpendicular to the polarizing transmission axis, i.e. it is a red filter. The transmission curves for these polarizers are indicated on FIG. 3.

The liquid crystal cell 6 may be constructed as described in U.K. Pat. Nos. 1,472,247 and 1,478,592 and as shown in FIG. 2. Two glass slides 9, 10 are spaced typically 8 $\mu$m apart by a spacer 11. The inner face of the slide 9 is coated by an upper and a separate and lower transparent electrode layer 12a, 12b, e.g. of tin oxide. The inner face of the slide 10 is coated with a single electrode 13. Prior to assembly the glass slides 9, 10 are treated as follows: the inner faces are coated with polyvinyl alcohol (p.v.a.) and after drying, unidirectionally rubbed with a soft tissue. The slides 9, 10 are assembled with the rubbing directions orthogonal as taught in U.K. Pat. Nos. 1,472,247 and 1,478,592. A liquid crystal material mixture 14 of a nematic liquid crystal plus a small amount of a cholesteric liquid crystal is introduced between the slides 9, 10. The cholesteric material imparts a natural cholesteric twist to the liquid crystal mixture and it is arranged that the pitch of this twist is twice or more the distance between the slides 9, 10. In addition to the natural twist the surface treatment of the slides 9, 10 provides alignment of the liquid crystal molecules at the surface of the layer along the rubbing directions. As a result plane polarized light passing through the cell is rotated by 90°, providing the plane of such light is parallel or perpendicular to the rubbing directions.

Alignment of the surface molecules may also be obtained by evaporation of a transparent dielectric, such as magnesium fluoride or silicon monoxide, onto the slides at an evaporation angle of less than 15° to the slide surface. Such an evaporation provides alignment of surface liquid crystal molecules with a tilt of about 30° to the slide surface. Alternatively the evaporation may be at an angle between 15° and 45° in which case the molecules of a liquid crystal will be parallel to the slide surface and perpendicular to the evaporation direction. Additional to this evaporation at an angle between 15° and 45° the slide surface may be unidirectionally rubbed in a direction perpendicular to the evaporation direction. This additional rubbing provides a tilt of the liquid crystal molecules of about 2°, as does rubbing on non-evaporated surfaces.

The object of evaporation and/or rubbing in any suitable combination on the two slides is two fold; to produce a surface alignment of the liquid crystal and to produce a tilt of the molecules throughout the whole layer of liquid crystal material. To avoid patchiness of display due to reverse tilt this molecular tilt must be in the same general direction thus imparting a tilt to the central molecules and thus a preferred direction of tilting into an ON state for the cell.

The cell 6 is arranged with the alignment direction parallel and perpendicular to the optical axis of the first and second selective polarizers 4, 5. The neutral polarizer 7 is arranged with its transmission axis parallel to the alignment direction in the adjacent slides of the cell i.e. vertical.

When the CRT screen 8 is energized it emits light at both green and red wavelengths. With the cell 6 in its OFF state the plane of polarized light from both color selective polarizers will be rotated by 90° but only the green light corresponding to the first polarizer 4 will pass through the analyzer 7. Thus an observer 21 will see only the green color from the screen 8. When the cell 6 is in its ON state there is no rotation of polarized light. Thus an observer will see the screen colored red since the plane of polarization of the red light from the second polarizer 5 is now parallel to the analyser 7. Green, horizontally polarized, light from the first selective polarizer 4 is blocked by the analyzer 7.

Thus, by switching the cell 6 ON and OFF an observer will alternately see a red and a green display. A U.K. standard 625 line television displays information by raster scanning alternate lines (i.e., $312\frac{1}{2}$ lines) to form a field and follows this by raster scanning the remaining $312\frac{1}{2}$ lines interlaced with the first $312\frac{1}{2}$ lines. A complete picture is thus formed by two fields forming one frame in 40 milliseconds, i.e. each field is written in 20 ms at a field rate of 50 Hz. These two fields are arranged each to display intensity information appropriate to a color e.g. green and red so that the CRT shows alternate fields representing green and red information. If the cell is switched ON and OFF in synchronism with the field rate a two color display will be seen due to the retinal persistence of an observer's eyes.

Although the display emits only two colors, green and red, an observer sees not just a combined green and red image but a combined green, red, orange, yellow and yellow-green image. This arises because any point on the display may have sequentially, different intensities of red and green light as received by the eye. If these amounts are equal, yellow is seen. If the balance is towards red then orange or red is seen. If the balance is towards green then yellow-green or green is seen.

Since it is not possible completely to switch the cell 6 between the ON and OFF states in the flyback time of a normal television e.g. 0.5 to 1 msec, the upper and lower halves of the cell are switched separately. Thus the lower half is switched, by application of a voltage between electrodes 12b and 13, while the C.R.T. is raster scanning the upper half of the screen 8. Similarly the upper half of the cell 6 is switched, by application of a voltage between electrodes 12a and 13, while the cathode ray tube is raster scanning the lower half of the screen 8.

The cell 6 is turned ON and OFF by application of a burst of low and high frequency $f_l$, $f_h$, electrical signals respectively, where $f_l < f_c < f_h$ and where $f_c$ is the critical frequency at which the liquid crystal dielectric anisotropy changes between positive and negative values.

The peak amplitude of the waveforms for switching the upper and lower halves of the cell 6 are shown in FIGS. 5a and b respectively. To turn the cell 6 ON signal $f_l$ is applied from time $t_0$ to $t_1$. No signal is applied during $t_1$ to $t_2$. During time $t_2$ to $t_3$ signal $f_h$ is applied to drive the cell OFF. From $t_3$ to $t_0$ no signal is applied. The sequence repeats for both upper and lower halves of the cell 6. For the lower half of the cell 6 $t_0$ occurs a little way before $t_1$ for the upper half of the cell 6.

Since the cell 6 is a capacitor it is difficult to provide enough power to switch the cell 6 at the high frequency $f_h$. Thus it is advantageous to connect the cell in a parallel tuned circuit resonant at $f_h$ to increase the cell impedance at $f_h$. This is shown in FIG. 6 where the cell 6 has a capacitor $C_B$ and inductance L connected in series between the upper electrode 12a and back electrode 13. Similarly a capacitor $C_B$ and inductance L are connected in series between the lower electrode 12b and back electrode 13. The capacitance between electrodes 12a and 13 is $C_{LC}$, and likewise the capacitance between electrodes 12b and 13 is $C_{LC}$. The function of $C_B$ is to block signal $f_l$ (to prevent a short circuit through L) while having a negligible reactance at $f_h$.

$$\text{Resonant frequency} = \frac{1}{2\pi \sqrt{LC_{LC}}} \text{ (approximately)}$$

and is arranged to equal $f_h$.

Impedance of each resonant circuit $$Z_{AB} = \frac{L_r}{rC_{LC}}$$

where r is series resistance of inductance L.

Unless care is taken in timing the application of $f_l$ and $f_h$ a patchy display may be observed due to the liquid crystal molecules in some parts of the cell being incorrectly aligned relative to other molecules. This is explained with reference to FIGS. 4a to 4g which show diagrammatically liquid crystal molecular alignment in a parallel rubbed (in opposite directions) cell for ease of illustration and to FIG. 4h which shows a front view of a $\pi/2$ twisted cell having a patchy appearance.

Figure 4:
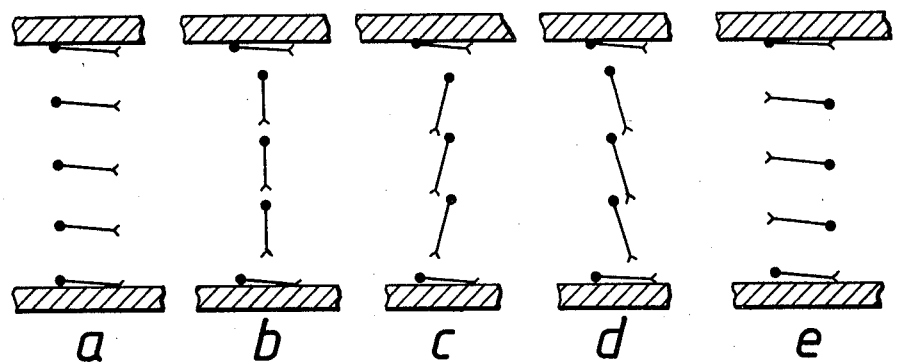
Figure 4:
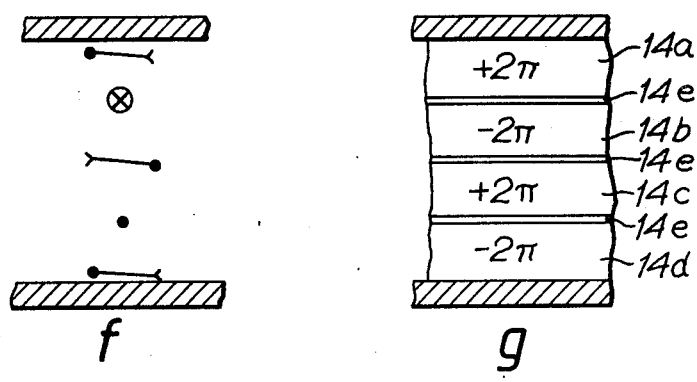
Figure 4:
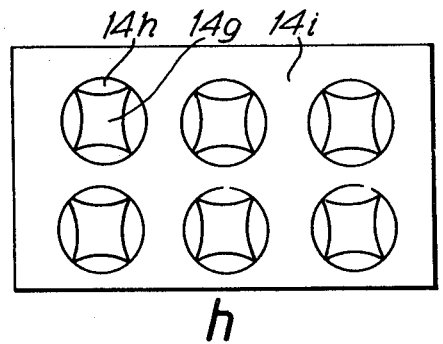

FIG. 4a shows molecules in a cell OFF state with no applied voltage. Application of a low frequency signal $f_l$ causes the molecules to align parallel to the applied field except for molecules bound by surface effects at the slide surface as shown in FIG. 4b. If the signal $f_l$ is removed the molecules at the center of the layer FIG. 4c initially rotate further away from the OFF state of FIG. 4a and then rotate back towards the OFF state as in FIG. 4d before finally relaxing back to the OFF state of FIG. 4a. This initial rotation may be termed "kickback" and may last for about 10 ms with a tilt of up to 30° from the perpendicular to the slides. If the signal $f_h$ is applied while the molecules are in their "kickback" position, FIG. 4c then the molecules in the center of the layer will align themselves, FIG. 4e, $\pi$ from their initial, FIG. 4a, position.

This condition involves a high free energy and the layer will preferentially adopt a $\pm 2\pi$ twisted alignment as indicated in FIG. 4f. This gives rise to broad bands of $+2\pi$ and $-2\pi$ 14a-d separated by a narrow region of zero twist 14e as shown in FIG. 4g. In the case of an initially $\pi/2$ twisted cell the application of the signal $f_h$ during "kickback" can result in a uniformly twisted state or in an array of large patches as shown in FIG. 4h. The patches are (astroidal) regions 14g of material having a $-3\pi/2$ twist within an approximately circular region 14h of $\pi/2$ twist with the remaining background 14i having a $5\pi/2$ twist. These mar the display appearance and can cause color changes at angles of viewing other than normal incidence.

The effect of kickback is further explained by FIG. 7 which shows the initial part of the curve of light transmission against time for a $\pi/2$ twisted cell arranged between parallel polarizers. At t=0 the cell is ON (as in FIG. 4b) and transmission is at a maximum. On removal of all voltage the molecules at the center of the cell rotate to the maximum "kickback" position approximately at c (as in FIG. 4c) and the light transmission is lower than at b. The molecules then at the center rotate back through the homeotropic condition at b' and continue towards the OFF condition (as in FIG. 4a). As the cell goes from the ON state to the OFF state there exists within the liquid crystal layer a shear flow of velocity gradient $S_n$ between the molecules. This shear flow decreases from its maximum value at b and then reverses its direction approximately at c and slowly decreases with increasing time. The initially high value of shear just after b causes a body torque on the molecules which results in the central molecules kicking back and then reversing their direction of rotation as the shear reduces, changes direction, and then dies away.

When a high frequency signal is applied at a time $(t_2-t_1)$ after the natural decay shown in FIG. 7 has commenced, the behavior obtained is different depending on which of the five regions I to V in FIG. 7 the time $(t_2-t_1)$ lies in.

If $f_h$ is applied while the molecules are still virtually in the homeotropic (FIG. 4b) position, region I, they may return to the plane of the cell by rotating either with or against the tilt imposed by surface alignment. This can give a patchy display, different to FIG. 4h, in which small areas of a multiple twist are arranged randomly in a background of $\pi/2$ twist.

The behavior when $f_h$ is applied during region II depends on the sign of the viscosity coefficient known as $\alpha_3$ or $\mu_3$, described in The Physics of Liquid Crystals by P. G. deGennes, Oxford, Chapter 5. Many nematic and long pitch cholesteric liquid crystals have negative $\alpha_3$, which means that they maintain stable alignment in the presence of shear flow and align at a definite angle to the direction of flow. However, all materials known which exhibit two frequency behavior at useful temperatures and have a usably low value of $f_c$ (e.g. < 100 kHz) have a positive value of $\alpha_3$ over all, or virtually all, of their liquid crystalline temperature range. When $\alpha_3 > 0$, their orientation may become unstable above a certain critical value of shear (i.e. velocity gradient) $S_c$, which will depend on, among other things, the magnitude of $\alpha_3$. The electrical signal $f_h$ produces additional shear $S_h$ within the layer 14 as it rotates the molecules into the plane of the cell. The additional shear generated depends, for a given liquid crystal cell, on the applied voltages and the time at which application of $f_h$ is commenced. If the total shear $S_n+S_h$ exceeds $S_c$ then the molecules are spontaneously driven out of their normal planes of rotation by the instability effect and adopt different alignments in different areas of the cell. This gives a patchy appearance, such as that shown for a rectangular cell in FIG. 4h, in which the form of the patches may be related to convective-like mode patterns formed by the flow of the liquid within the confines of the cell boundaries. Since the applied voltages must be sufficient to switch the cell both properly ON and properly OFF, these regular patches are commonly observed in practical displays if $(t_2-t_1)$ falls in region II.

If $f_h$ is applied after a point c' (region III), close to c, where the sum of natural and induced shears is reduced sufficiently that $S_n+S_h < S_c$ but before b' so that kickback is still in progress, then for repetitive switching at television frame rates, the cell returns to a uniform $5\pi/2$ twist since the molecules at the center of the cell are forced down to be substantially antiparallel with their direction in the normally OFF state.

Only if $f_h$ is applied when the kickback is over (or virtually over) region V, will the cell return to uniform $\pi/2$ twist.

Finally, if $f_h$ is applied close to b', region IV, the cell will show regions of $5\pi/2$ twist and others of $\pi/2$ twist, the latter corresponding (for reasons explained later) to areas where the cell is slightly thinner due to the variations of thickness that inevitably occur.

Thus in order to obtain a patch-free display $f_h$ must be applied during regions III of V.

The general shape of FIG. 7 is common to many cells of varying liquid crystal material and layer 14 thickness d. However, the time scale is compressed with decreasing values of layer thickness d (proportionally as $d^2$) and with increasing layer temperature. For example with ZLI 518 the time scale in FIG. 7 for a cell at 20° C. where $d=8$ μm may be approximately equal to that of a cell at 40° C. where $d=12$ μm. A heater may be incorporated into the display 6 to raise the liquid crystal material 14 temperature as required. Such a heater may be a tin oxide coating on an outside surface of the cell 6 to act as an electrical resistive heater. Alternatively the electrodes 12a, 12b, 13 inside the cell may be used as heater elements. An auxiliary effect of heating the liquid layer may be to increase the critical shear, $S_c$, for the onset of instability in region II because of the decrease in the magnitude of $\alpha_3$ with increasing temperature. Thus, in the case of ZLI 518, whereas a cell with $d=12$ μm cannot be operated patch-free at 25 Hz or greater frequency at room temperature, one with $d=8$ μm will give a uniform $5\pi/2$ twisted OFF state at room temperature (region III in FIG. 7) and a uniform $\pi/2$ twisted OFF state (region V) if it is heated to about 38° C. In applications requiring flicker free display, e.g. television, the time available between successive fields may be insufficient, at 20° C., to allow the molecules to decay into region V and there $f_h$ must be applied in region III.

One further restriction on the application of $f_h$ is necessary; the signal $f_h$ must be removed before the molecules at the center of the cell are driven to lie parallel to the glass slides 9, 10, since otherwise the surface induced tilt in the center of the layer, necessary for obviating reverse tilt, is destroyed.

From the above it is clear that for a given field rate, fixed by the television, it is neccessary to adjust periods $t_1$ to $t_2$, and $t_2$ to $t_3$, and the value of $f_h$ to obtain a patch free display.

In one example the CRT field rate was 50 Hz. The liquid crystal layer was ZLI 518 (Merck AG, Darmstadt) of thickness 8 μm at 20° C.

$t_0$ to $t_1 = 12$ msec
$t_1$ to $t_2 = 12.5$ msec
$t_2$ to $t_3 = 3.5$ msec
$t_3$ to $t_0 = 12$ msec amplitude of $f_1 = 150$ volts peak to peak at 600 Hz sine-wave amplitude of $f_h = 80$ volts peak to peak at 50 KHz sine wave.

We claim:

1. A liquid crystal display arranged to avoid a patchy appearance in the display when the display is switched by the two frequency method, said display comprising a liquid crystal cell capable of rotating the plane of plane polarized light passing therethrough and transmitting polarized light without such rotation dependent on electrical signals applied to the cell, the cell itself comprising two spaced transparent slides each bearing an electrode structure containing a layer of a nematic or a cholesteric liquid crystal material having a dielectric anisotropy which changes between positive and negative values at a critical frequency, $f_c$, of applied electrical signals, a first source of low frequency, $f_1$, electrical signals, a second source of high frequency, $f_h$, electrical signals, where $f_h$ is greater than $f_c$ which is in turn greater than $f_1$, and control logic for causing application of the two different frequency signals $f_1$ and $f_h$ in sequence to the cell with a space between the end of application of the low frequency signals $f_1$ and the beginning of application of the high frequency signal $f_h$ whereby the liquid crystal material adopts a uniform twist in the cell when driven to an OFF state thereby to eliminate a patchy appearance in the display resulting from areas of different molecular twist in said liquid crystal material.

2. A liquid crystal display arranged to avoid a patchy appearance in the display when the display is switched by the two frequency method, said display comprising a cathode ray tube having a screen which is capable, when energized, of emitting light in at least a first and a second narrow range of wavelengths, field scan circuitry for providing at least a first and a second field image on the screen in sequence and related to different input means, at least a first and second color selective polarizer each having a selective transmission at different ones of the peak wavelengths emitted by the screen and arranged with their optical axis at an angle to one another, a liquid crystal cell capable of rotating the plane of plane polarized light passing therethrough and transmitting polarized light without such rotation dependent on electrical signals applied to the cell, the cell itself comprising two parallel spaced transparent slides bearing transparent electrode structures on their opposing inner faces and a layer of nematic or cholesteric liquid crystal material between the slides having a dielectric anisotropy which changes between positive and negative values at a critical frequency, $f_c$, of applied electrical signals, a first source of electrical signals of comparatively low frequency, $f_l$, less than said critical frequency $f_c$, a second source of electrical signals of comparatively high frequency, $f_h$, greater than said critical frequency $f_c$, means for applying the signals $f_l$ and $f_h$ to the cell during alternate time intervals respectively in synchronism with different fields of images displayed on the screen, delay means for providing a delay between the removal of said comparatively low frequency signal $f_l$ from the cell and the application of said comparatively high frequency signal $f_h$ to the cell so that liquid crystal molecules may rotate from a position normal to liquid crystal layer, timing means for controlling the application of signals $f_l$, and $f_h$, and timing means for limiting time duration of application of signals $f_h$ to stop $f_h$ before liquid crystal molecules at the center of the layer are driven to lie parallel to the slides, whereby reverse tilt of the liquid crystal molecules within the layer is avoided, the arrangement being such that a required display is shown as successive fields of different images and observed as an image in two or more colors, and the liquid crystal material adopts a uniform molecular twist after each application of signal $f_h$ thereby to avoid a patchy appearance in the display resulting from areas of different molecular twist.

3. A liquid crystal display according to claim 2 wherein the delay means provides a delay sufficient to cause application of signal $f_h$ during the liquid crystal molecules kickback condition.

4. A liquid crystal display according to claim 2 wherein the delay means and the timing means allow the delay and timing to be varied.

5. A liquid crystal display according to claim 2 wherein the input means are at least two different inputs providing at least two different images.

6. A liquid crystal display according to claim 2 wherein the input means is a single input for providing in sequence signals representing different colors of the same image.

7. A liquid crystal display according to claim 2 and further comprising means for heating the liquid crystal material.

8. A liquid crystal display according to claim 7 wherein the heater means comprise resistive electrodes on the inner faces of the slides.

9. A liquid crystal display according to claim 7 wherein the heater means comprises a resistive electrode layer on an outside surface of a slide.

10. A liquid crystal display according to claim 2 and further comprising a capacitor and inductance connected to the cell to form a parallel tuned circuit having a resonance near the frequency of the signal $f_h$.

* * * * *